United States Patent [19]

Ting

[11] 4,065,587
[45] Dec. 27, 1977

[54] U.V. CURABLE POLY(ETHER-URETHANE) POLYACRYLATES AND WET-LOOK POLYMERS PREPARED THEREFROM

[75] Inventor: Vincent Wen-Hwa Ting, Brunswick, Ohio

[73] Assignee: SCM Corporation, New York, N.Y.

[21] Appl. No.: 685,374

[22] Filed: May 11, 1976

[51] Int. Cl.$^2$ .............................................. B05D 3/06
[52] U.S. Cl. ........................................ 427/54; 427/53; 260/859 R; 204/159.15; 204/159.23
[58] Field of Search ............................. 427/44, 54, 53; 260/859 R, 858, 75 NP, 75 NT; 204/159.15, 159.23

[56] References Cited

U.S. PATENT DOCUMENTS

| | | | |
|---|---|---|---|
| 3,499,852 | 3/1970 | Schroeder | 260/859 R |
| 3,989,609 | 11/1976 | Brack | 427/54 |

Primary Examiner—John H. Newsome
Attorney, Agent, or Firm—A. Joseph Gibbons

[57] ABSTRACT

Polyether-urethane polymers, prepared from the reaction of specific molar ratios of diisocyanates with specific mixtures of polyetherdiols, glycols, triols and tetraols, and having 4–10 reactive isocyanate groups are further reacted with hydroxyalkyl acrylates through the free isocyanate functionality to provide polymers having from about 4–10 acrylates units per each mole unit of polyurethane chain. Such polymers when cross-linked under ultraviolet radiation in the presence of photosensitizers, specific reactive monofunctional acrylate solvents and multifunctional acrylate cross-linking agents cure without air inhibition to yield superior "wet look" finishes especially useful for coating metal, wood and floor tile.

16 Claims, No Drawings

U.V. CURABLE POLY(ETHER-URETHANE) POLYACRYLATES AND WET-LOOK POLYMERS PREPARED THEREFROM

BACKGROUND OF THE INVENTION

Subsequent to the development of cellular polyurethane foams, single component polyurethane compositions were developed for coating applications. In general the most desirable urethane coatings are based on polyester and polyacrylate modified polyurethane formulations. The prior art compositions, exemplified generally by U.S. Pat. No. 3,652,506, U.S. Pat. No. 3,509,234 and U.S. Pat. No. 3,782,961, are unsuitable for providing "wet look" coatings in that they usually require the coatings to be prepared and used in an inert atmosphere, require the particular substrate to be preheated prior to the application of the urethane coating and/or require an "ionizing radiation" curing step. The instant compositions, in contrast, are not air-inhibited and polymerize and cure under ultraviolet radiation to superior "wet look" finishes at ambient temperatures without the use of a protective atmosphere.

SUMMARY OF THE INVENTION

This invention relates to coating composition and process comprising a polyurethane polymer obtained by reacting a polyurethane intermediate having 4 to 10 terminally-positioned reactive isocyante groups with 4 to 10 molar equivalents of a hydroxy (lower) alkyl acrylate or methaacrylate, said intermediate resulting from the reaction of 1-5 moles of polyether diol having a molecular weight in the range of 100-10,000; 2 to 6 moles of a monomer polyol having at least 3 reactive hydroxyl groups and containing 3 to 10 carbon atoms, and 6 to 24 moles of an organic diisocyanate.

One object of this invention is to produce a radiation curable coating comprising a photosensitizer, the above-described polyurethane polymer, a monofunctional acrylate monomer, and a multifunctional acrylate cross-linking agent, said coatings having higher crosslinking densities and higher curing speeds than found in conventional urethane coatings.

Another object is to provide a process for coating particular substrates with polyurethane polymers which do not require the substrate to be heated prior to the application of the coating and which may be cured under ambient atmosphere conditions without air inhibition wherein said process comprises:

a. forming a coating composition by mixing together on a weight percent basis 30 to 70 percent of the above described polyurethane polymer, 10 to 40 percent of a monofunctional acrylate monomer, 5 to 50 percent of a mulfifunctional acrylate cross-linking agent and 3 to 5 percent of a photosensitizer, said compositions totaling 100 percent and wherein said monofunctional acrylate monomer is selected from the group consisting of phenyl cellosolve acrylate, isobornylacrylate and benzylacrylate;

b. applying said mixture as a 1-10 mil thick coating to a substrate selected from the group consisting of flat stock metal, wood, plastic, cloth, paper, fiberboard, and floor tile; and c. curing said coated substrate in air at ambient temperature by passing the substrate at a rate from 10 to 1000 foot/minute through an effective field of ultraviolet radiation.

Still another object is to provide "wet look" poly(ether-urethane)polyacrylate coatings, based on the above described composition and process, having exceptional adhesion, flexibility, stain resistance, mar and impact resistance and to provide finished products coated with such U.V. curable compositions.

DETAILED DESCRIPTION

The above objects are obtained through the use of specific isocyanateterminated prepolymers or oligomers, having at least 4 and preferably 5 to 10 reactive isocyanate units, obtained by reacting various multihydroxy components including polyetherdiols, aliphatic diols, monomer aliphatic triols and/or tetraols with diisocyanates in such proportion to produce the above noted isocyanate-substituted prepolymers. The free isocyanate groups are further reached with hydroxyalkyl acrylates and/or hydroxyalkyl methacrylates to produce a polyurethane polymer having 4 to 10 terminal acrylate functional groups. The resulting polyurethane polymer having ethylenically reactive double bonds in the acrylates moiety is formulated into a U.V. curable coating by adding one or more monofunctional functional acrylate monomers, a multifunctional acrylate crosslinking agent and one or more photosensitizers. Such compositions are not inhibited by air and are readily curable by ultraviolet radiation at room temperature and thus represent a desirable advance over the urethane coatings of the prior art. "Wet look" coatings based on these compositions have not heretofore been prepared.

The diols especially useful for the purpose of preparing "wet look" finishes of the present invention include the common polyalkylenether glycols, polyether diols, minor proportions of monomer lower alkyldiols and mixtures thereof. The polyalkylenether glycols are given by the general formula $H(OR)_nOH$, wherein R is alkylene radical containing one to eight carbon atoms and preferably two to four carbon atoms and n is an integer chosen to provide molecular weights of the diol in the range of about 100 to 10,000. Especially preferred are the polypropylene glycols having a molecular weight in the range of 350 to 4600, used either alone or in conjunction with minor proportions of short chain diols. Such polyethers, well known to the coatings art, may be varied widely by appropriate selection of the starting glycols and alkylene oxide reactants and by reactant conditions. The choice of polyether in the formation of the poly(etherurethane) polyacrylate polymer is highly critical for imparting desirable characteristics to the wet look coating. When the polyurethane intermediate has less than 6 reactive isocyanate groups, the polyether glycol advantageously will have a molecular weight substantially in excess of 1000 or consists of a mixture of two or more polyether glycols, one of which must have a molecular weight substantially in excess of 1000. By substantial excess is meant a molecular weight at least 50 percent greater than that specified. Mixtures of polyether glycols produce even more desirable wetlook finishes and hence are preferred in all formulations.

With regard to the monomer polyols useful in preparing the instant poly(etherurethane) intermediates, monomer triols and tetraols having 3 to 12 carbon atoms and at least three reactive hydroxy groups are particularly suited. Preferred monomer polyols include trimethylol propane, trimethylol ethane, glycerine, polycaprolactone triols, polyether triols, polyester triols and pentaerythritol.

Examples of hydroxyalkyl acrylates and methacrylates useful for imparting the functional unsaturated units necessary for the cross-linking cure reaction include 2-hydroxyethyl acrylate, 2-hydroxyethyl methacrylate and their corresponding propyl and butyl derivatives. Also included in this category are the monomethacrylate and monoacrylates of diethylene glycol, glycerol, trimethylol propane and pentaerythritol. Further examples include di- and tri-acrylates and methacrylates of the above mentioned glycols provided that at least one free hydroxy group remains for reactions with each of the 4 to 10 functional isocyanate groups on the polyurethane chain. Other useful hydroxy acrylates include N-hydroxymethyl methacrylamide and N-hydroxymethyl acryl amide. A preferred reactant is trimethylol propane diacrylate and especially preferred is 2-hydroxyethyl acrylate because of its availability and the characteristics imparted to the resultant coating.

Diisocyanates which are useful in preparing the urethane polymers include a variety of organic diisocyanates capable of reacting with the above-mentioned diols, triols, and tetraols. These include aromatic, aliphatic and cycloaliphatic diisocyanates and polyisocyanates and mixtures of two or more which are well known to the urethane art. Representative compounds include toluene-2,4-diisocyanate, m-phenylene diisocyanate, 1,5-naphthylene diisocyanate, 1,4-tetramethylene diisocyanate, 1,6-hexamethylene diisocyanate, 1,10-decamethylene diisocyanate, 1,4-cyclo-hexylene diisocyanate, 4,4'-methylene-bis-(cyclohexyl isocyanate), 1,5-tetrahydronaphthylene diisocyanate and 1,4-xylylene diisocyanate. Especially preferred is isophorone diisocyanate because of the desirable properties imparted to the urethane polymer.

In order to provide the required 4 to 10 terminally-positioned reactive isocyanate groups on the polyurethane intermediate and the corresponding 4 to 10 molar equivalents of the cross-linkable units of carbon-to-carbon unsaturation provided by the hydroxy (lower) acrylate and/or methacrylate reactants, it is necessary to control closely within the ranges indicated below the molar proportions of the following reactants:

a. 1 to 7 moles of the polyether diol, and preferably a mixture of polyether diols, in the range of 100 to 10,000;
b. 2 to 8 moles of a monomer polyol having from 3 to 12 carbon atoms and having at least three reactive hydroxy groups;
c. 6 to 24 moles of an organic diisocyanate; and
d. 4 to 10 moles of the hydroxy (lower) acrylate or methacrylate.

The above defined molar proportions of reactants are more properly exemplified and understood with reference to the following table:

| | Molar Quantities of Reactants | | |
|---|---|---|---|
| Polyether Diol | Monomer Polyol | Diisocyanate | Hydroxyacrylate |
| 1 | 2 | 6 | 4 |
| 2 | 2 | 7 | 4 |
| 2 | 3 | 9 | 5 |
| 1 | 3 | 8 | 5 |
| 2 | 4 | 11 | 7 |
| 5 | 6 | 18 | 8 |
| 7 | 8 | 24 | 10 |

Because it is desirable in most cases to maintain a high degree of linearity in the polyether-urethane intermediate and polymer, the monomer polyol ingredients should be selected with considerable excess of monomer triol with respect to polyols having more than three reactive hydroxyl groups. Thus the use of pentaerythritol must be limited in the initial formation of the linear polyurethane intermediates. Where it is desirable to have maximum functionality on the linear polyurethane intermediate it is suggested that a higher proportion of monomer polyols having hydroxyl functionality in excess of three (i.e., pentaerythritol) can be used by first reacting the triol monomers to produce essentially a linear polymer and then in a second stage completing the reaction with the pentaerythritol polyol components. It is understood that the respective molar quantities of diisocyanate and hydroxyacrylate shown in the above table will have to be adjusted when the monomer polyol contains more than three reactive hydroxy groups.

The choice of monofunctional acrylate reactant or solvent is especially critical in providing "wet look" coatings of the present invention. Useful reactive monomers include 2-ethylhexyl acrylate, n-butyl acrylate, Cellosolve acrylate, benzyl acrylate, isobornyl acrylates, phenyl Cellosolve acrylate and the corresponding methacrylates.

Useful multifunctional acrylate cross-linking agents for the purposes of forming the "wet look" coatins of the present invention include melamine acrylate, trimethylolpropane triacrylate, pentaerythritol triacrylate, epoxidized oil acrylate, neopentylglycol diacrylate, 1,6-hexanediol diacrylate and the corresponding methacrylates.

The photosensitizers or photoinitiators useful in the practice of this invention are those known to the art of curing polymers having reactive (curable) carbon-to-carbon unsaturated linkages and include cyanines, triphenylmethane dyestuffs and derivatives of benzanthrone, quinone and anthraquinone and their respective halogen substituted products. Aromatic ketone sensitizers include acetophenone, benzophenone, flourenone and benzoin. Other suitable photoinitiators include, for example, benzoin methyl ethers, benzoin ehtyl ether, didesyl ether, desyl bromide, desyl chloride, desyl amine, polychlorinated polyphenyl resins, polychlorinated diphenyls, polychlorinated triphenyls, and mixtures of the two, chlorinated rubbers, copolymers of vinyl chloride and vinyl isobutyl ether, chlorinated paraffins, mono- and polychlorobenzenes, mono- and polybromobenzenes, mono- and polychloroxylenes, mono- and polybromoxylenes, dichlormaleic anhydride, halogenated polyolefins, such as chlorinated polyethlene, 2,4-dimethylbenzene sulfonyl chloride, 1-bromo-3-(m-phenoxyphenoxy benzene), 2-bromoethylmethyl ether, chlorendic anhydride and mixtures of these.

Various alkoxy derivatives of acetophenone are especially suitable sensitizers either when used alone or in conjunction with other sensitizers. A combination of diethoxyacetophenone and benzophenone is a preferred photosensitizer for the present curing purposes. Other lower alkoxy acetophenones which may be substituted include dimethoxy, dipropoxy, dibutoxy and corresponding derivatives containing up to eight carbon atoms in the said alkoxy moiety. For economy and availability the diethoxy derivative is most preferred. The photoinitiators or sensitizers can be used in amounts ranging between 0.1 and 10 percent by weight of the complete photopolymerizable composition, and preferably from about 2 to 5 percent. The radiation curable composition may include, if desired, about 0.1 to 2.0 percent, based on the weight of the total composition, of an accelerating agent, including, for example, mercaptans and their derivatives, i.e., ethyl mercaptoacetate, amine oxides, such as bis(2-hydroxyethyl) cocoamine oxide and bis(2-hydroxyethyl) octadecylamine oxide as well as other common accelerators known to the art.

The photopolymerizable compositions of the present invention are utilized for metal coatings and particularly for providing a high gloss "wet look" woodgrain finish in the metal decorative and can making industries. Other substrates which may be coated include wood, paper, cloth, fiberboard and plastic. The coatings are conventionally applied by gravure, reverse or direct roll or by spary coating processes. Commonly used modifiers including colorants, pigments, wetting agents, leveling agents may be included in the U.V. polymerizable compositions as necessary. Modifying agents typically are used in amounts ranging from about 1 to 60 weight percent based on the total weight of the photopolymerizable compositions.

Examples of metals which can be coated include sized and unsized tin plate and aluminum flat stock. The present compositions are especially useful in imparting a "wet look" to metal surfaces previously primer-coated and decorated with epoxy primers. A durable coating can be applied to a variety of floor tile including vinyl, asbestos and their combinations.

Irradiation of the compositions may be accomplished by any one or a combination of a variety of methods. The composition may be exposed, for example, to actinic light from any source and of any type as long as it furnishes an effective amount of ultraviolet radiation needed for proper cure. The compositions polymerizable by actinic light generally exhibit their maximum sensitivity in the range of about 1800 A to 4000 A, and preferably about 2000 A to 3000 A. Suitable sources include, but are not limited to, carbon arcs, mercury-vapor arcs, fluorescent lamps with special ultraviolet light-emitting phosphors, argon glow lamps, photographic flood lamps, and so forth. The time of irradiation must be long enough to effect a proper cure. Curing of the coating applied to various substrates is conveniently conducted at ambient temperatures by passing the substrate at a rate of from 10 to 1000 foot/minute through an effective field of ultraviolet radiation.

The following specific examples illustrate only a limited number of embodiments; accordingly, the invention is not limited thereto. All parts and percentages being by weight, temperature degrees Centigrade, and molecular weights reported as number average molecular weights unless otherwise specified.

EXAMPLE 1

Preparation of Poly(ether-urethane) Polyacrylate

Into a dry kettle with agitation and under a $N_2$ sparge are charged 2.21 pounds of trimethylol propane, 8.26 pounds Niax Polyol PPG-1025 (Union Carbide, see notes to table 2) having a molecular weight of approximately 1025 and 0.53 pounds toluene. The mixture is heated to 120° C. and adventitious water is removed by azeotropic distillation over a one hour period. After cooling to 54° a mixture of 10.8 pounds of phenyl Cellosolve acrylate and 6.4 grams of methoxy hydroquinone (MEHQ) inhibitor are added. Under an air sparge 14.69 pounds of isophorone diisocyanate was added. The batch was gradually heated to 85° C. and held at that temperature for 2 hours. After cooling to 40° C. a mixture of 1.58 pounds of phenyl cellosolve acrylate and 3.00 grams of dibutyltin dilaurate were added over a 30 minutes interval allowing the batch to exotherm to 80° C. The temperature was maintained at 80° C. for 1 hour. When the temperature cooled to 40° C. a premix of 9.37 pounds of 2-hydroxyethyl acrylate, 12 grams dibutyltin dilaurate and 10 grams MEHQ was added over an interval of 30–60 minutes during which exotherm to 80° C. occured. After 4 hours of agitation 18.7 pounds of phenyl cellosolve acrylate and 2.1 grams MEHQ were added. Agitation was continued for 20 minutes and the polymer product was stored in dry lined containers. Excellent stability of the stored polymer was observed.

EXAMPLE 2

The polyurethane polymer of Example 1 was formulated by blending together 73.9 parts polyurethane polymer of Example 1 (50% dispersion in phenyl Cellosolve acrylate), 14.8 parts melamine acrylate, 8.20 parts phenyl Cellosolve acrylate, 2.04 parts benzophenone and 1.02 parts diethoxy acetophenone. The resulting coating composition having a viscosity of 800–850 cps/25° C. was applied by reverse rollercoater to a 0.0235 inch inked flat stock aluminum substrate previously primed with an epoxy primer, and was subjected to an Ashdee medium pressure Mercury light source 200 watt/inch at a line speed of 22.5 ft/min. under ambient temperature and normal air atmosphere to give a 3 mil thick "wet look" film. The film exhibited good mar resistance, hardness, flexibility, impact and adhesion as indicated in Table 1.

EXAMPLES 3–10

In a manner corresponding to the process of Example 1, acrylate terminated polyurethane polymers were prepared from the respective components as indicated in Table 2. The respective polymers were formulated in various monoacrylate monomer as indicated in Table 3. Coatings prepared from each of the compositions shown in Table 3 yield satisfactory "wet-look" coatings when applied to aluminum flat stock and irradiated with ultraviolet radiation as indicated in Example 2.

EXAMPLE 11

Preparation of Poly(ether-urethane) Polyacrylate

In a dry reactor equipped with mechanical agitation and condenser was charged 2.36 pounds trimethylol propane, 11.89 pounds Niax Polyol PPG-1025, and 0.70 pounds toluene. Under a $N_2$ atmosphere and stirring the reactants were heated to 120° C. and adventitious water was removed by azeotropic distillation over one hour. All the toluene was removed by distillation under reduced pressure (29 mm Hg) and the batch was cooled to 54°. The nitrogen blanket was removed. Under an air sparge 30.26 pounds of isobornylacrylate and 2.80 grams of methoxy hydroquinone (MEHQ) inhibitor are added. Thereafter 13.03 pounds isophorone diisocyanate was added and allowed to exotherm to 85° C. Hold for 1 hour; and cool to 40° C. before adding 3.60 grams dibutyltin dilaurate catalyst. Allow the batch to exotherm to 80° C. and hold these for 2 hours. The resultant product has a viscosity of Z-1 and an NCO content of 2.8% by weight. Add the premix 3.77 pounds 2-hydroxyethyl acrylate and 2.40 gram MEHQ dropwise over a 1 hour period; allow the batch to exotherm to a maximum of 85°. Hold for 3-4 hours at 80° C. after completion of premix addition. Final viscosity is Z-5. An additional 3.20 grams MEHQ was added and the batch mixed for 20 minutes. The product was stored in a dry lined container. Final physical properties of resin were % Solid—50% in isobornylacylate; Viscosity Z-5-Z-6, Color: 4(Gardner); lb/gallon 8.64.

EXAMPLE 12

The resin of Example 11 was formulated according to the procedure in Example 2 with the substitution of a molar equivalent of isobornyl acrylate for the phenyl Cellosolve acrylate. The resulting coating composition having a viscosity of 2500 cps/25° C., was applied to aluminum stock substrate and irradiated as indicated in Example 2 to yield a "wet look" film having excellent mar resistance, hardness and other properties as indicated in Table 1.

EXAMPLE 13

A poly(ether-urethane) acrylate is prepared according to Example 1 except that NIAX POLYOL PPG-3025 (Union Carbide, see notes to Table 2) having a molecular weight of approximately 3025 is substituted for one half the molar equivalent of Niax Polyol PPG-1025 and isobornyl acrylate is substituted for the phenyl cellosolve acrylate. When this 'asymmetric' polyether-urethane polyacrylate was then formulated (using isobornyl acrylate to replace phenyl Cellosolve acrylate), applied to the flat stick aluminum substrate and cured according to the procedure of Example 2, the "wet look" film exhibited superior mar resistance, hardness, flexibility, impact and adhesion properties as shown in Table 1.

TABLE 3

| Resin | Monoacrylate Monomer | Percent Solids | Viscosity* |
|---|---|---|---|
| 44 | Phenylcellosolve Acrylate | 50 | X |
| 63 | Phenylcellosolve Acrylate | 70 | Z-4 |
| 66 | Phenylcellosolve Acrylate | 75 | Z-6 |
| 88 | Phenylcellosolve Acrylate | 60 | Z-9 |
| 89 | Methylcarbamoyloxyethyl Acrylate | 70 | Z-9 |
| 14 | Methylcarbamoyloxyethyl Acrylate | 70 | Z-10 |
| 99 | Phenylcellosolve Acrylate | 50 | V-W |
| 4062 | Isobornyl Acrylate | 50 | Z-5 |
| 1720 | Isobornyl Acrylate | 50 | Z-10 |

*Gardner Holdt Viscosity Test, A represents a low viscosity and proceeds through the alphabet to Z-10 representing high viscosity.

What is claimed is:

1. A poly(ether-urethane)polyacrylate polymer comprising the product obtained by reacting a polyurethane intermediate having 4 to 10 terminally-positioned reactive isocyanate groups with 4 to 10 molar equivalents of a hydroxy (lower) acrylate or methacrylate, said intermediate resulting from the reaction of 1 to 7 moles of a polyether diol having a molecular weight in the range of 100 to 10,000; 2 to 8 moles of a monomer polyol having 3 to 12 carbon atoms and at least 3 reactive hydroxyl groups; and 6 to 24 moles of an organic diisocyanate.

2. The polymer of claim 1 wherein the polyether diol is polypropyleether diol having a molecular weight in the range of 350 to 4600; the monomer polyol is trimethylol propane; the diisocyanate is isophorone diisocyanate; and the hydroxyacrylate is 2-hydroxyethyl acrylate.

3. The composition of claim 2 wherein the molar ratio of polyether:trimethyolpropane:diisocyanate:hydroxyacrylate is 2:3:9:5.

TABLE 1

| | Data and Properties of Cured Film | | |
|---|---|---|---|
| Example No. | 2 | 12 | 13 |
| Light source | * | * | * |
| Line Speed (ft/min.) | 22.5 | 22.5 | 22.5 |
| Film Thickness (mils) | 2.5–3.0 | 2.5–3.0 | 2.5–3.0 |
| Mar Resistance | Good | Excellent | Excellent |
| Hardness | H | 2H | H |
| Gloss | Clear, Wet Look | Clear, Wet Look | Clear, Wet Look |
| Flexibility | Good, passes 1/8 inch Mandrel bend Passed Sharp 90° bend | Good, passes | Excellent, passes sharp 90° Bend-Post bake at 200° F. for 5 minutes |
| Reverse Impact | Passes 60–70 in/lb | Passes 60–70 in/lb | Passes 60–70 in/lb. |
| Cross hatch adhesion | 100% | 100% | 100% |

*Medium Pressured Mercury Bulb (Ashdee)

TABLE 2

| | | | | Acrylate Terminated Polyurethane Oligomers* | | | | | |
|---|---|---|---|---|---|---|---|---|---|
| Ex. No. | Resin No. | Triol | Moles | Diol | Moles | Diisocyanate** | Moles | Hydroxy Acrylate | Moles |
| 3 | 44 | PCP-0300 | 2.0 | PPG-1025 | 1.0 | Isophorone Diisocyanate | 6.0 | HEA | 4.4 |
| 4 | 63 | TP-440 | 2.0 | LP-33 | 1.0 | " | 6.0 | HEA | 4.4 |
| 5 | 66 | TMP | 2.0 | PPG-2025 | 1.0 | " | 6.0 | HEA | 4.4 |
| 6 | 88 | TMP | 2.0 | ED-204 | 1.0 | " | 6.0 | HEA | 4.4 |
| 7 | 89 | TMP | 2.0 | TDG | 1.0 | " | 6.0 | HEA | 4.4 |
| 8 | 14 | LHT-112 | 2.0 | PPG-1025 | 1.0 | " | 6.0 | HEA | 4.4 |
| 9 | 99 | TMP | 2.0 | PPG-1025 | 1.0 | " | 6.0 | HEA | 4.4 |
| 10 | 4062 | TMP | 3.0 | PPG-1025 | 2.0 | " | 9.0 | HEA | 5.0 |
| 13 | 1720 | TMP | 3.0 | PPG-1025 PPG-3025 | 1.0 1.0 | " | 9.0 | HEA | 5.0 |

PCP = Polycaprolactone triol of M. Wt. 540
PPG 1025; PPG 2025 = Polypropylene glycol of M. Wt. 1025 and 2025 respectively;
TP-400 = Pluracol Polyol (BASF) of M. Wt. 440
LP-33 = Polysulfide Polymer (Wyandotte) of M. Wt. 1000;
ED 204 = 2,2-Dimethyl-3-Hydroxypropyl; 2,2-Dimethyl-3-hydroxy propionate
HEA = 2-Hydroxyethyl acrylate
TDG = Thiodiethylene glycol
LHT 112 = Polyether polyol with hydroxyl number of 122.5
*The isocyanate prepolymers were prepared with NCO/OH ratios of 1.55-2.00 to 1.00

4. A U.V. curable composition comprising on a weight percent basic 30 to 70 percent of a polyurethane polymer of claim 1: 10 to 40 percent of a monofunctional acrylate monomer; 5 to 50 percent of multifunctional acrylate cross-linking agent and 3 to 5 percent of a photosensitizer, said composition totaling 100 percent.

5. The composition of claim 4 wherein the polyurethane intermediate comprises the reaction product of 2 moles of a polyether diol, 3 moles of monomer polyol and 9 moles of organic diisocyanate, said intermediate being further reacted with 5 moles of hydroxyalkylacrylate.

6. The composition of claim 4 wherein the polyurethane intermediate comprises the reaction product of 1 mole of polypropyleneether diol having a molecular weight of 1250, 2 moles of trimethylol propane and 6 moles of isophorone diisocyanate, said intermediate being further reacted with 4 moles of a hydroxyethyl acrylate.

7. The composition of claim 4 wherein the photosensitizer is selected from the group consisting of benzophenone, diethoxyacetophenone and mixtures thereof.

8. The composition of claim 5 wherein the photosensitizer is a mixture comprising 1 to 3 parts benzophenone and 1 part of diethoxy acetophenone.

9. A process for imparting a wet look coating to a substrate which comprises:
  a. forming a radiation curable composition comprising on a weight percent basis:
    i. 30 to 70 percent of a poly(ether-urethane) polymer of claim 1:
    ii. 10 to 40 percent of a monofunctional acrylate monomer
    iii. 5 to 50 percent of a multifunctional acrylate cross-linking agent; and
    iv. 3 to 5 percent of a photosensitizer; said composition totaling 100 percent;
  b. applying said mixture as a 0.1 to 10 mil thick coating to a substrate selected from the group consisting of flat stock metal, wood, fiberboard and floor tile; and
  c. curing said coating substrate in air at ambient temperature by passing the substrate at a rate of from 10 to 1000 foot/minute through an effective field of ultraviolet radiation.

10. The process of claim 9 wherein the poly(ether-urethane) polymer comprises the reaction product of:
  a. a polyether diol having a molecular weight in the range of 100 to 10,000;
  b. a monomer polyol selected from the group consisting of trimethylol propane, trimethylol ethane, glycerine, polycaprolactone triols, pentaerythritol and mixtures thereof;
  c. isophorone diisocyanate, and
  d. hydroxyacrylate selected from the group consisting of 2-hydroxyethylacrylate, 2-hydroxy-3-chloropropyl acrylate, 2-hydroxyethyl methacrylate, 2-hydroxypropylacrylate and mixtures thereof;
wherein the ratio of a:b:c:d is 2:3:9:5; and said monofunctional acrylate monomer is selected from the group consisting of 2-phenoxyethyl acrylate, isobornyl acrylate and benzylacrylate.

11. The process of claim 9 wherein the multifunctional cross-linking agent is selected from the group consisting of melamine acrylate; pentaerythritol triacrylate, trimethylolpropane triacrylate, epoxidized soybean oil acrylate and neopentylglycol diacrylate.

12. The process of claim 10 wherein the photosensitizer is selected from the group consisting of benzophenone, diethoxy acetophenone and mixtures thereof.

13. The process of claim 12 wherein the monoacrylate monomer is isobornyl acrylate and the cross-linking agent is melamine acrylate.

14. The process of claim 10 wherein the substrate is aluminum flat stock.

15. The process of claim 10 wherein the polyether diol is a polypropyleneether diol having a molecular weight in the range of 350 to 4600; the monomer polyol is trimethylol propane; the hydroxyacrylate is 2-hydroxyethyl acrylate; and the monofunctional acrylate monomer is isobornyl acrylate.

16. The process of claim 10 wherein up to 50 molar percent of the polypropyleneether diol having a molecular weight in the range of 350 to 4600 is replaced by a polypropyleneether having a molecular weight of 3025.

* * * * *

UNITED STATES PATENT AND TRADEMARK OFFICE
CERTIFICATE OF CORRECTION

PATENT NO. : 4,065,587
DATED : December 27, 1977
INVENTOR(S) : Vincent Wen-Hwa Ting It is certified that error appears in the above-identified patent and that said Letters Patent are hereby corrected as shown below:

Col.1, line 29, change "isocyante" to --isocyanate--; line 31, change "methaacrylate" to --methacrylate--; line 54, change "mulfifunctional" to --multifunctional--. Col.2, line 10, change "isocyanateterminated" to --isocyanate-terminated--; line 17, change "reached" to --reacted--; line 24, delete the word "functional" before "acrylate monomers". Col.4, line 27, change "coatins" to --coatings--; line 43, change "ehtyl" to --ethyl--. Col.5, line 18, change "spary" to --spray--. Col.8, line 28, change "polypropyleether" to --polypropyleneether--. Col.9, line 2, change "basic" to --basis--. Col.10, line 42, after "polypropyleneether" insert --diol--.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*